United States Patent [19]

Ezzell et al.

[11] 4,330,654
[45] May 18, 1982

[54] NOVEL POLYMERS HAVING ACID FUNCTIONALITY

[75] Inventors: Bobby R. Ezzell, Lake Jackson; William P. Carl, Angleton; William A. Mod, Lake Jackson, all of Tex.

[73] Assignee: The Dow Chemical Company, Midland, Mich.

[21] Appl. No.: 158,425

[22] Filed: Jun. 11, 1980

[51] Int. Cl.$^3$ .................. C08F 214/02; C08F 214/16; C08F 214/18
[52] U.S. Cl. ..................................... 526/243; 521/27; 526/240; 526/245; 526/247; 528/392; 528/401
[58] Field of Search ............... 526/247, 240, 243, 245; 521/27; 528/392, 401

[56] References Cited

U.S. PATENT DOCUMENTS

| | | | |
|---|---|---|---|
| 2,393,967 | 2/1946 | Brubaker | 526/195 |
| 2,559,752 | 7/1951 | Berry | 260/29.6 |
| 2,593,583 | 4/1952 | Lontz | 528/502 |
| 3,041,317 | 6/1962 | Gibbs et al. | 526/243 |
| 3,114,778 | 12/1963 | Fritz et al. | 568/674 |
| 3,214,478 | 10/1965 | Milian | 568/615 |
| 3,242,218 | 3/1966 | Miller | 568/615 |
| 3,250,806 | 5/1966 | Warnell | 260/535 |
| 3,282,875 | 11/1966 | Connolly et al. | 260/29.6 |
| 3,301,893 | 1/1967 | Putman et al. | 260/513 |
| 3,351,619 | 11/1967 | Warnell | 526/247 |
| 3,450,684 | 6/1969 | Darby | 526/247 |
| 3,536,733 | 10/1970 | Carlson | 260/348.5 |
| 3,560,568 | 2/1971 | Resnick | 260/513 |
| 3,784,399 | 1/1974 | Grot | 210/500 |
| 3,909,378 | 9/1975 | Walmsley | 204/98 |
| 3,969,285 | 7/1976 | Grot | 204/262 |
| 4,025,405 | 5/1977 | Dotson et al. | 204/98 |
| 4,035,254 | 7/1977 | Gritzner | 204/98 |
| 4,035,255 | 7/1977 | Gritzner | 204/98 |
| 4,065,366 | 12/1977 | Oda et al. | 204/98 |
| 4,085,071 | 4/1978 | Resnick et al. | 204/98 |
| 4,126,588 | 11/1978 | Ukihashi et al. | 521/31 |
| 4,132,682 | 1/1979 | Seita et al. | 526/247 |
| 4,138,373 | 2/1979 | Ukihashi et al. | 526/247 |
| 4,138,426 | 2/1979 | England | 526/245 |
| 4,151,053 | 4/1979 | Seko et al. | 204/98 |
| 4,166,165 | 8/1979 | Hisasue et al. | 526/247 |
| 4,192,725 | 3/1980 | Dotson et al. | 204/98 |
| 4,197,179 | 4/1980 | Ezzell | 204/98 |

FOREIGN PATENT DOCUMENTS

| | | |
|---|---|---|
| 1238458 | 9/1975 | Fed. Rep. of Germany . |
| 54-118597 | 8/1979 | Japan . |
| 1406673 | 9/1975 | United Kingdom . |
| 1497748 | 1/1978 | United Kingdom . |
| 1497749 | 1/1978 | United Kingdom . |
| 1518387 | 7/1978 | United Kingdom . |

OTHER PUBLICATIONS

Daniel J. Vaughan, Nafion-An Electrochemical Traffic Controller.
C. J. Hora et al., Nafion ® Membranes Structured for High Efficiency Chlor-Alkali Cells, Oct., 1977.
H. Ukihashi, Ion Exchange Membrane for Chlor-Alkali Process, Apr. 1977.
G. A. Olah, New Synthetic Reagents and Reactions, Aldrichimica Acta, vol. 12, No. 3, 1979.
G. E. Munn, Nafion Membranes-Factors Controlling Performance In Electrolysis of Salt Solutions, Oct. 1977.
Fearn, et al., Journal of Polymer Science, vol. 4, pp. 131-140, (1966).
Lovelace, Rausch and Postelnek, Aliphatic Fluorine Compounds, Reinhold, N.Y. (1958), p. 107.
R. D. Chambers, Fluorine in Organic Chemistry, John Wiley and Sons, pp. 211-212 (1973).
F. W. Evans et al., Journal of Organic Chemistry, vol. 33, No. 5, May, 1968, pp. 1837-1839.
M. Hudlicky, Chemistry of Organic Fluorine Compounds, 2nd Ed., John Wiley & Sons, N.Y. 20-21.
Maomi Seko, Commercial Operations of the Ion Exchange Membrane Chlor-Alkali process, Apr. 1976.
Maomi Seko, The Asahi Chemical Membrane Chlor-Alkali Process, Feb. 9, 1977.
W. G. F. Grot et al., Perfluorinated Ion Exchange Membrane, May 1972.

Primary Examiner—Harry Wong, Jr.
Attorney, Agent, or Firm—James H. Dickerson, Jr.

[57] ABSTRACT

Polymers and the process for producing polymers by the polymerization of at least three monomers wherein at least one monomer is selected from the group consisting of tetrafluoroethylene, trifluoromonochloroethylene, trifluoroethylene, vinylidene fluoride, 1,1-difluoro-2,2-dichloroethylene, 1,1-difluoro-2-chloroethylene, hexafluoropropylene, 1,1,1,3,3-pentafluoropropylene, octafluoroisobutylene ethylene, vinylchloride, trifluoronitrosomethane, perfluoronitrosoethane and alkyl vinyl ether, and at least one other monomer is selected from the group represented by the general formula:

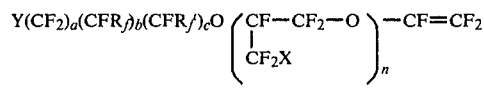

and at least one monomer is selected from the group of monomers represented by the general formula:

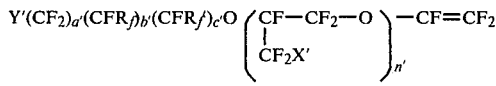

These polymers are useful as ion exchange membranes in electrolytic cells, especially chlor-alkali electrolytic cells. Other uses include solid, strong acid catalyst useful in corrosive environments, electrodialysis and other similar membrane separation processes.

18 Claims, No Drawings

NOVEL POLYMERS HAVING ACID FUNCTIONALITY

BACKGROUND OF THE INVENTION

U.S. Pat. No. 3,282,875 discloses useful copolymers of fluorovinyl compounds and sulfonated fluorovinyl ethers of the general structure $$MSO_2CFR_fCF_2O(CFYCF_2O)_nCF=CF_2$$

where $R_f$ is a radical selected from the class consisting of fluorine and perfluoroalkyl radicals having from 1 to 10 carbon atoms, Y is a radical selected from the class consisting of fluorine and the trifluoromethyl radical, n is an integer of one to three inclusive, and M a radical selected from the class consisting of fluorine, the hydroxyl radical, the amino radical and radicals having the formula -OMe where Me is a radical selected from the class consisting of alkali metals and quaternary ammonium radicals.

Inclusion of a third component chosen from perfluoro alpha-olefins such as hexafluoropropylene or compounds of the type $CF_2=CFO(CF_2)_nCF_3$ where n is 0 to 5 is taught as useful when elastomeric properties are desired.

U.S. Pat. No. 4,126,588 teaches a fluorinated cation exchange membrane made of a three component copolymer produced by copolymerizing a fluorovinyl-polyether having the formula I $$CF_2=CF-O-CF_2-(CFXOCF_2)_\alpha-(CFX')_\beta-(C-F_2OCFX'')_\gamma-A \quad (I)$$

wherein α is 0 to 3; β is 0 to 6; γ is 0 to 4 and either α or γ is not 0; X, X' and X'' respectively represent -F or a $C_{1-5}$ perfluoroalkyl group; A represents —CN, —COF, —COOH, —COOR$_1$, —COOM or —CONR$_2$R$_3$; R$_1$ represents a $C_{1-10}$ alkyl group preferably a $C_{1-3}$ alkyl group, R$_2$ and R$_3$ respectively represents hydrogen atom or a $C_{1-10}$ alkyl group; and M represents an alkali metal atom or a quaternary ammonium group, a fluorovinyl compound having the formula II $$CF_2=CF-(O)_\delta-(CFY)_\gamma-A \quad (II)$$

wherein δ is 0 to 1; γ is 1 to 6; Y represents -F or a $C_{1-5}$ perfluoroalkyl group; A is defined in the formula I and a fluorinated olefin having the formula III $$CF_2=CZZ' \quad (III)$$

wherein Z and Z' respectively represent —H, —Cl, —F or —CF$_3$.

This patent teaches that copolymers of monomers I and III are low molecular weight and that these polymers, when made having suitable concentrations of the functional group A, have unsuitable mechanical properties. Copolymers made from monomers II and III are higher molecular weight, but have low flexibility and blister when used in chlor-alkali electrolytic cells. These mechanical properties are overcome by forming polymers with monomers I, II, and III.

Japanese Publication No. 1977118597 teaches polymers made by choosing one monomer from each of the three groups $$I(CF_2)_pO(CF_2CF_2O)_q(\overset{\overset{\displaystyle CF_3}{|}}{C}FCF_2O)_rCF=CF_2$$

where p has a value 2–9, q a value 0–5, and r a value 0–5, $$CF_2=CZZ'$$

where Z and Z' are fluorine, chlorine, hydrogen, or CF$_3$, and $$CF_2=CX+(OCF_2CFY)_l(O)_m(CFY')_nA$$

where X is F or —CF$_3$; Y and Y' are F, a perfluoro alkyl group of carbon 1–10; and A is one of the following ion exchange groups, —SO$_3$H, —COOH, —PO$_3$H$_2$, —φOH (φ is an aryl group), or —C(CF$_3$OH) or a group which can be replaced by one of these ion exchange groups. In addition, l is an integer 0–3, m is 0 or 1, and n is 0–12. The polymers produced from the above monomers are later crosslinked making use of the iodo substituent. The crosslinking of the polymer can be by any of the well known techniques such as heat, ultraviolet radiation, or ionizing radiation. One example is to heat the polymer to about 250° C. while removing the iodine generated under reduced pressure.

British Pat. No. 1,497,748 teaches a polymer membrane made from (1) a vinyl ether represented by the general formula $$X(CF_2)_n-O-CF=CF_2$$

where
n=2–12
X=CN, COF, COOH, COOR, COOM, or CONR$_2$R$_3$,
R=alkyl group having 1–10 carbon atoms,
R$_2$ and R$_3$=H or R,
M=Na, K, or Cs, and
(2) tetrafluoroethylene, and
(3) R$_f$—O—CF=CF$_2$
were
R$_f$=a perfluorinated alkyl group having 1–3 carbon atoms.

British Pat. No. 1,518,387 shows polymers produced from the polymerization of at least three monomers, each selected from one of these groups:

Group I $$CF_2=CYY'$$

where Y and Y' are H, Cl, CF$_3$ or F.

Group II $CF_2=CF-O-CF_2-(-CFXOCF_2-)_l-(-CFX'-)_m-(-CF_2OCFX''-)_n-A$ wherein l is 0 to 3; m is 0 to 6; n is 0 to 4, and one of l and n is not zero; X, X' and X'' are same or different and respectively represent —F or —CF$_3$; A represents —CN, —COF, —COOH, —COOR$_1$, —COOM, and —CONR$_2$R$_3$ and R$_1$ represents a $C_{1-10}$ alkyl group, preferably a $C_{1-3}$ alkyl group, R$_2$ and R$_3$ each represent a hydrogen atom or a $C_{1-10}$ alkyl group and M represents an alkali metal or a quaternary ammonium group, and a fluorinated olefin or a hydrolyzed copolymer thereof, which preferably has a pendant side chain having an ion exchange group such as a carboxylic acid group.

Group III

B—(CFZ')$_{n'}$—(O)$_{m'}$—(CFZCFO)$_{l'}$—CF=CF$_2$ where
Z and Z'=F or a C$_{1\text{-}10}$ perfluoroalkyl group,
l'=0-3,
m'=0-12,
n'=0-12,
B=—F, —H, —Cl, —CHF$_2$ or —CF$_3$, which have no ion exchangable group or no functional group which can be converted to an ion exchangable group.

Various conventional techniques for polymerization are taught in the following references: *Emulsion Polymerization—Theory and Practice* by D. C. Blackley, John Wiley & Sons; U.S. Pat. No. 3,041,317; U.S. Pat. No. 2,393,967; U.S. Pat. No. 2,559,752; and U.S. Pat. No. 2,593,583.

U.S. Pat. No. 4,025,405 shows electrolytic cells having a stable, hydrated, selectively permeable, electrically conductive membrane. The membrane is a film of fluorinated copolymer having pendant sulfonic acid groups containing recurring structural units of the formula:

$$\begin{array}{c} \text{F} \\ | \\ \text{C—CF}_2 \\ | \\ (\text{R})_n \\ \text{SO}_3\text{H} \end{array} \quad (1)$$

and $$\text{CXX'—CF}_2 \quad (2)$$

where
R is $$-\text{CF—CF}_2\text{O}(\text{CFY—CF}_2\text{O})_m-$$
$$\quad\ \ |$$
$$\quad\ \ \text{R}'$$

in which R' is F or perfluoroalkyl of 1 to 10 carbon atoms; Y is F or CF$_3$; m is 1, 2 or 3; n is 0 or 1; X is F, Cl, H, CF$_3$; X' and X are CF$_3$—(CF$_2$)$_z$ wherein z is 0-5; the units of formula (1) being present in an amount of from 3-20 mole percent.

BRIEF DESCRIPTION OF THE INVENTION

Polymers may be produced by polymerizing at least three monomers, where at least one monomer is selected from a first group consisting of tetrafluoroethylene, trifluoromonochloroethylene, trifluoroethylene, vinylidene fluoride, 1,1-difluoro-2,2-dichloroethylene, 1,1-difluoro-2-chloroethylene, hexafluoropropylene, 1,1,1,3,3-pentafluoropropylene, octafluoroisobutylene ethylene, vinylchloride, trifluoronitrosomethane, perfluoronitrosoethane and alkyl vinyl ethers, and at least one other monomer is selected from a second group represented by the general formula:

$$Y(CF_2)_a(CFR_f)_b(CFR_f')_cO\left(\begin{array}{c}CF-CF_2-O\\|\\CF_2X\end{array}\right)_n-CF=CF_2$$

where:
Y is an acid group or an acid derivative group easily convertible to an acid group;
a is zero or an integer greater than zero;
b is zero or an integer greater than zero;
c is 0 or 1;
a+b+c≠0;
X is Cl, Br, F, or mixtures thereof when n>1;
n is zero or an integer greater than zero; and,
Rf and Rf' are independently selected from the group consisting of F, Cl, perfluoroalkyl radical and fluochloroalkyl radical;

and at least one monomer is selected from a third group of monomers represented by the general formula:

$$Y'(CF_2)_{a'}(CFR_f)_{b'}(CFR_f')_{c'}O\left(\begin{array}{c}CF-CF_2-O\\|\\CF_2X'\end{array}\right)_{n'}-CF=CF_2$$

where:
Y' is Cl or Br;
a' is zero or an integer greater than zero;
b' is zero or an integer greater than zero;
c' is zero or one;
a'+b'+c'≠0;
X' is F, Cl, Br, or mixtures thereof when n'>1;
n' is zero or an integer greater than zero; and
R$_f$ and R$_f$' are independently selected from the group consisting of F, Cl, perfluoroalkyl radical and chloroperfluoro alkyl radical;
provided that when Y is a carboxylic acid group or a group easily convertible to a carboxylic acid group, n is one or an integer greater than one and X is F, then n' must be one or an integer greater than one.

DETAILED DESCRIPTION OF THE INVENTION

This invention relates to polymers which are useful as ion exchange membranes in electrolytic cells, especially chlor-alkali electrolytic cells. Other uses include solid, strong acid catalyst useful in corrosive environments, electrodialysis and other similar membrane separation processes.

The polymers are produced from the polymerization of at least three monomers wherein at least one monomer is selected from a first group which consists of tetrafluoroethylene, trifluoromonochloroethylene, trifluoroethylene, vinylidene fluoride, 1,1-difluoro-2,2-dichloroethylene, 1,1-difluoro-2-chloroethylene, hexafluoropropylene, 1,1,1,3,3-pentafluoropropylene, octafluoroisobutylene ethylene, vinylchloride, trifluoronitrosomethane, perfluoronitrosoethane and alkyl vinyl ether,
and
at least one other monomer is selected from a second group represented by the general formula;

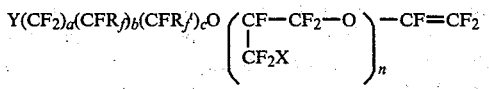

where:
Y is an acid group or an acid derivative easily convertible to an acid group;
a is zero or an integer greater than zero;
b is zero or an integer greater than zero;
c is 0 or 1;
$a+b+c \neq 0$;
X is Cl, Br, F, or mixtures thereof when $n>1$;
n is zero or an integer greater than zero; and
$R_f$ and $R_f'$ are independently selected from the group consisting of F, Cl, perfluoroalkyl radical and fluochloroalkyl radical; and at least one monomer is selected from a third group represented by the general formula:

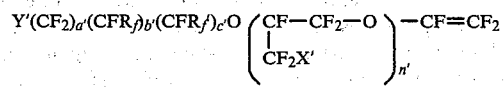

where:
Y' is Cl or Br;
a' is zero or an integer greater than zero;
Preferably $a=0-3$; $b=0-3$; $n=0-6$ and $R_f=Cl$ or F.
b' is zero or an integer greater than zero;
c' is zero or one;
$a'+b'+c' \neq 0$;
X' is F, Cl, Br, or mixtures thereof when $n'>1$;
n' is zero or an integer greater than zero; and
$R_f$ and $R_f'$ are independently selected from the group consisting of F, Cl perfluoroalkyl radical and chloroperfluoro alkyl radical;
provided that when Y is a carboxylic acid group or a group easily convertible to a carboxylic acid group, n is one or an integer greater than one and X is F, n' must be one or an integer greater than one.

Preferably, $a'=0-3$; $b'=0-3$; $n'=0-6$ and $R_f'=Cl$ or F.

The polymers of the present invention are useful as ion exchange membranes for electrolytic cells, particularly chlor-alkali electrolytic cells and as solid, strong acid catalyst. The polymers are particularly useful in these and other applications because of the reactive site (Y') which can be used for additional reactions not possible on perfluorinated materials.

In general, the polymerization procedures and techniques followed in the present invention are known. A very good reference for polymerization techniques is *Emulsion Polymerization—Theory and Practice*, by D. C. Blackley, published by John Wiley & Sons.

Additionally, the polymers of the present invention may be prepared by general polymerization techniques developed for homo- and copolymerizations of fluorinated ethylenes, particularly those employed for tetrafluoroethylene which are described in the literature. Non-aqueous techniques for preparing the copolymers of the present invention include that of U.S. Pat. No. 3,041,317, to H. H. Gibbs, et al, that is by the polymerization of a mixture of the major monomer therein, such as tetrafluoroethylene, and a fluorinated ethylene containing sulfonyl fluoride in the presence of a free radical initiator, preferably a perfluorocarbon peroxide or azo compound, at a temperature in the range 0°-200° C. and at pressures in the range 1-200, or more atmospheres. The nonaqueous polymerization may, if desired, be carried out in the presence of a fluorinated solvent. Suitable fluorinated solvents are inert, liquid, perfluorinated hydrocarbons, such as perfluoromethylycyclohexane, perfluorodimethylcyclobutane, perfluorooctane, perfluorobenzene and the like.

Aqueous techniques which may also be used for preparing the polymers of the present invention include contacting the monomers with an aqueous medium containing a free-radical initiator to obtain a slurry of polymer particles in non-waterwet or granular form, as disclosed in U.S. Pat. No. 2,393,967, to Brubaker, or contacting the monomers with an aqueous medium containing both a free-radical initiator and a technologically inactive dispersing agent, to obtain an aqueous colloidal dispersion of polymer particles and coagulating the dispersion, as disclosed, for example, in U.S. Pat. No. 2,559,752 to Berry and U.S. Pat. No. 2,593,583 to Lontz.

In the general structure, Y is an acid group or an acid derivative easily convertible to an acid group. Y may be

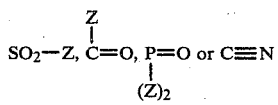

or other appropriate groups. Where Z=I, Br, Cl, F, $NRR_1$ and OA; where $R_1$ and $R_2$ are independently H, alkyl having one or more carbons, or aryl and A=H, alkali metal, quaternary nitrogen or R.

When polymers made form the vinyl ether monomers of the present invention are to be formed into sheets for use as membranes, such as in chloralkali cells, it is desirable to choose Z so that the polymers formed are thermoplastic to allow fabrication by conventional means, such as melt extrusion, but after farication can be easily converted to the acid or alkali metal salt of the acid. As an example, when $Y=SO_2Z(Z=F)$, the polymers can be formed into sheets by various plastic fabrication techniques. After fabrication, the $SO_2F$ group is easily converted to the alkali metal salt of the corresponding sulfonic acid, $-SO_2ONa$ (Z=ONa), which can be converted to the sulfonic acid, $-SO_2OH$ (Z=OH), by reaction with acids, such as mineral acids.

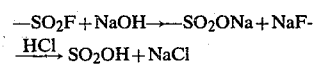

When Y is chosen as $-C\equiv N$, a nitrile, the above conditions are met since it is well known that nitriles are converted to carboxylic acids by hydrolysis.

When the polymers of the present invention are to be used in particle or powder form, such for acid catalyst, it is not critical in the choice of Z since fabrication is not as large a factor. In this case, Z can conveniently be any of the radicals listed. It can be $-OH$ so as to directly have Y as an acid group or it can be any group rendering Y convertible to an acid group by further reaction.

It is particularly beneficial to form polymers from the vinyl ether monomers of the present invention were Y'=Cl or Br and not iodine. It is well known (M. Hudlicky, Chemistry of Organic Fluorine Compounds, 2nd Edition, John Wiley & Sons, New York, pages 420-421) that perfluoroalkyl iodides react under mild conditions with fluorovinyl compounds, such as tetrafluoroethylene, to form telomeric perfluoroalkyl iodides.

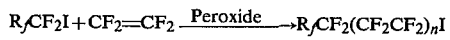

This reaction can be initiated with either peroxide compounds or heat. The prior art teaches polymers of tetrafluoroethylene, acid substituted vinyl ether monomers and iodoperfluoroalkyl vinyl ethers as useful since on heating they lose iodine to form crosslinked fluoropolymers. However, formation of high molecular weight, linear polymers from iodo substituted monomers is severely restricted because of competing reactions of the alkyl iodide moiety with the olefinic moiety entering into the polymerization reaction. At best, highly branched, low molecular weight polymeric materials are formed using conventional polymerization techniques. Formation of strong flexible films or structural materials, from the polymers, usually associated with high molecular weight plastic materials, is essentially eliminated.

Peroxide or heat initiated reactions of perfluoroalkyl chlorides or bromides, particularly chlorides, with olefins does not take place nearly as readily as perfluoroalkyl iodides. In fact, fluorochloro compounds are not known to take part, via the chloro substituate, in this reaction. Thus, it is possible, using the vinyl ether monomers of the present invention where $Y'=Cl$ or $Br$, to form high molecular weight, plastic type materials by conventional polymerization techniques known for producing fluoropolymers. The resulting polymers have the added feature of having a reaction site ($Y'$), known to be more reactive than perfluoropolymers where any additional reaction would have to take part on a fluorosubstituate. Only few reactions; and these requiring extreme conditions; are known to take place at a C—F linkage. In fact, the non reactivity of this linkage accounts for the commercial significance of most known fluoropolymers. In the polymers of the present invention, when $X'=Cl$ or $Br$, the site is available for further reaction either before or after fabrication, but preferably after. Introduction of controlled amounts of the halogen terminal monomers, third group, into polymers results in polymers having a group more chemically reactive than is the case of perfluoropolymers. This reactive site may be reacted with metallating reagents such as alkyl alkali metals to form intermediates which are useful for chemical modification, such as introducing additional ion exchange functionality and reaction with difunctional electrophiles for post crosslinking of the polymers. Exemplary of these reactions are

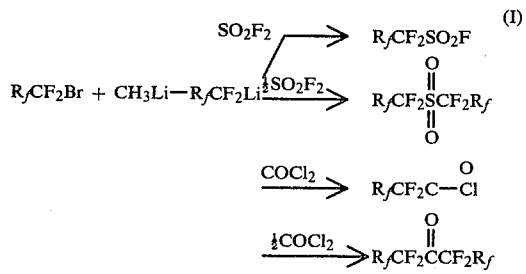

In addition to the chemistry described above, it is also possible, by heating the fluoroalkyl metal intermediate (I) to get metal fluoride elimination and thus introduce olefin sites into the polymers. These olefin sites can then be further reacted to introduce additional functionality or simply irradiated to introduce crosslinking. In this manner, the olefin site can be generated in the polymer, while the polymer is still in high surface area powder form. The polymer then may be fabricated into shapes such as films, and irradiated to produce the desired crosslinking. Optionally formation of the olefin can be accomplished in one step by reaction of the fluoroalkyl halide with metal (M) alkyls, wherein the metal fluoroalkyl is a transient intermediate.

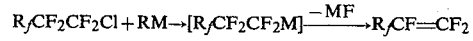

Particularly useful for the above type reactions are polymers where $X=X'=F$, n and n' are independently zero or greater.

Also useful, but less convenient for the additional chemical reactions, are polymers where $X'$ and $X$ are independently Cl or Br and n and n' are independently integers greater than zero. Multiple reaction sites introduced by $Y'$, $X$ and $X'$ in the latter case, while still undergoing the reactions described above, form more random polymer structures, making tailoring for specific uses more difficult though just as useful once attained.

A particularly desirable polymer of the present invention is where n and n' are each equal to zero and $Y'=Cl$. Copolymers of monomers such as tetrafluoroethylene from the first group and $n=0$ monomers from the second group have high melt viscosities and are thus difficult to fabricate. Introduction of the $n'=0$ monomer from the third group lowers the melt viscosity of the resulting polymer and in so doing results in more simple fabrication by conventional techniques such as extrusion. In addition, by using the $n'=0$ material, only one reaction site is introduced making post chemical modifications as described above less involved.

In certain cases, particularly when $n=0$, it is desirable to use values of $n'>0$. Introduction of the long pendent chain results in more internal plasticization and thus lower melt viscosity. In addition, more reactive sites are introduced when a highly cross-linked final polymer is desired. It is also possible to achieve significantly lowered melt viscosities by using monomers from the second group having values of n greater than zero. Thus, it can be seen that varying degrees of melt viscosity and post chemical potential modifications can be accomplished by having the flexibility to control and use different values of $Y'$, $X$, $X'$, n, and n'. This flexibility allows tailoring the polymers of the present invention to optimized materials for a wide range of applications.

In addition to the novel uses described above, it has been surprisingly discovered that when $Y=SO_3Na$ in the polymers of the present invention, large savings of energy result when the polymers are used as ion exchange membranes in chlor-alkali electrolytic cells. Cells containing the polymers operate at significantly lower cell voltage than do cells containing copolymers of monomers chosen only from the first group and the second group.

EXAMPLE 1

8 grams $FSO_2-(CF_2)_2-O-CF=CF_2$ and 1 gram $Cl(CF_2)_3-O-CF=CF_2$ were added to 400 ml deoxygenated water containing 3 grams $K_2S_2O_8$, 0.75 grams $NaHSO_3$, 1.5 grams $Na_2HPO_4$ and 3.5 grams $C_7F_{15}CO_2K$ under positive pressure of tetrafluoroethylene in a glass-lined stainless steel stirred reactor at 20° C. The pressure was varied between 55 and 60 psi in a uniform manner for 1¼ hours during the reaction. The reactor was vented, evacuated and heated under vacuum to 50° C. to remove residual monomers. The reactor contents were frozen, thawed, filtered and vigorously washed repeatedly to remove residual inorganics and soap. After vacuum drying, 14 grams of polymer was obtained which pressed very easily into a flexible, tough, transparent film at 500° F. The film hydrolyzed readily in concentrated NaOH solution in ethanol water to the sodium salt of the sulfonic acid.

The polymer analysis for sulfur was 3.25% for carbon, 21.3% and 0.56% chlorine by weight. Water absorption of the H+ form of the film was 37% and the specific resistance in concentrated (25%) NaCl was 58 Ω-cm. Titration equivalent weight of the H+ form of the film was 894.

EXAMPLE 2

Eight grams of $FSO_2—(CF_2)_2—O—CF=CF_2$ and 1 gram of $Cl(CF_2)_3—O—CF=CF_2$ were added to 400 ml of deoxygenated water containing 3 grams $K_2S_2O_8$, 1.5 grams $Na_2HPO_4$, 0.75 gram $NaHSO_3$, and 3.5 grams $C_7F_{15}CO_2K$ in a glass-lined stainless steel stirred reactor under 60 psi pressure of tetrafluoroethylene at 20° C. After 2¼ hours, the reactor was vented, evacuated and heated to 50° C. for 1 hour to remove residual volatiles. The contents were frozen, thawed, filtered, and vigorously washed to isolate the polymer and remove residual inorganics. After vacuum drying at 120° C. for 16 hours, the isolated polymer weighed 20 grams.

The polymer readily pressed into a thin, tough, transparent film which may be reacted with a concentrated base to convert the $FSO_2—$ groups to the metal salt form such as the $Na^+$ *form or the* $K^+$ forms. The H+ form of the film had a titration equivalent weight of 1240 and a water adsorption of 11.7%. Specific resistance of this polymer was 279 Ω-cm.

EXAMPLE 3

A mixture containing 6 grams $FSO_2—(CF_2)_2—O—CF=CF_2$ and 3 grams $Cl(CF_2)_3—O—CF=CF_2$ was added to 400 ml of deoxygenated water containing 3 grams $K_2S_2O_8$, 0.75 gram $NaHSO_3$, 1.5 grams $Na_2HPO_4$ and 3.5 $C_7F_{15}CO_2K$ under 60 psi tetrafluoroethylene pressure in a glass-lined stainless steel reactor with stirring at 20° C. After 2½ hours, the reactor was vented and heated to 50° C. under vacuum to recover monomers. The reactor contents were then frozen, thawed, filtered and the polymer was vigorously washed to remove residual soap and inorganics. The vacuum dried polymer weighed 29 grams and pressed easily into a flexible, tough, transparent film which was analyzed as containing 1.23% S and 0.86% Cl. A titration equivalent weight for this product after hydrolysis was 1725 and water absorption of the acid form was 14.5%.

EXAMPLE 4

Seven and three-tenths grams of a mixture of $FSO_2—(CF_2)_2—O—CF=CF_2$ and $Cl(CF_2)_3—O—CF=CF_2$ in a ratio of 10:1 were added to 300 ml of deoxygenated water containing 10 grams $K_2S_2O_8$, 2.50 grams $NaHSO_3$, 5 grams $Na_2HPO_4$ and 1.5 grams $C_7F_{15}CO_2K$ in a glass-lined autoclave heated to 50° C. with stirring under 65 psi applied tetrafluoroethylene pressure. After 35 minutes, the reactor is vented and evacuated to remove residual monomers. The reactor contents were then frozen to coagulate the polymer, thawed, filtered and washed repeatedly to remove residual soap and inorganics. The polymer easily pressed into a rubbery film at 450° F. and analyzed as 19.3% C, 0.3% Cl, and 4.3% S.

EXAMPLE 5

7.0 grams of $FSO_2CF_2CF_2OCF=CF_2$ and 1.0 grams of $ClCF_2CF_2OCF=CF_2$ were added to a glass-lined, one liter, stirred reactor containing 400 ml of deoxygenated water, 3 grams of $K_2S_2O_8$, 1.5 grams of $Na_2HPO_4$, 0.75 gram of $NaHSO_3$ and 3.5 grams of $C_7F_{15}CO_2K$ soap. Pressure of 60 psig of tetrafluoroethylene was applied to the reactor and the temperature adjusted to 20° C. The pressure and temperature were controlled at these conditions for a period of 2¾ hours, after which the reactor was vented, heated to 50° C. under vacuum to remove residual monomers, and then the contents removed. The reaction mixture was frozen to coagulate the polymer which was then filtered and washed several times with water to remove inorganics and soap. Thirty-four grams of dried polymer was obtained. After hydrolysis of a sample with base, the equivalent weight was determined to be 1666 by titration. The polymer contained 0.21% chlorine and showed I.R. peaks at 810 and 1465 $cm^1$ representative of the $—SO_2F$ group. The polymer readily pressed into a thin, thermoplastic film at 500° F.

EXAMPLE 6

A 1.5 gram sample of a film pressed from a polymer of $C_2F_4$, $Cl(CF_2)_3O$ $CF=CF_2$, and $FSO_2(CF_2)_2OCF=CF_2$ similar to the polymer of Example 2, was immersed in 95% ethanol at boiling point for 30 minutes at which time an equal volume of 30% NaOH solution was added and heating continued for 1 hour. The caustic solution was poured off and the film in the $—SO_3Na$ form was rinsed with 95% ethanol and immersed in a 50% volume ethanol water solution and heated for 30 minutes at which time an equal volume of 37% HCl was added to convert the film to the $—SO_3H$ form. After heating at the reflux point for 1 hour, the film was successively rinsed in 50% ethanol-water and d.i. water at the boiling point to extract any residual acid or salts. This film had a specific resistance of 285 Ω cm. After vacuum drying 16 hours at 110° C. in the $—SO_3H$ form and boiling in water 30 minutes, the film had a water absorption of 13.9%. Cut up into 1/16"-⅛" wide strips, 1.492 grams of the film neutralized 1.17 meq. of base when heated 30 minutes at 50° C. in 75 ml of 0.05 n NaOH and rinsed twice for 15 minutes in 75 ml portions of d.i. water at 50° C. The solutions were poured off and the unused base was titrated with 0.1 N HCl. Twenty-five and eight tenths milliliters was required. The equivalent weight as sulfonic acid was then calculated as 1275 from the neutralization data.

EXAMPLE 7

400 ml of deoxygenated water containing 3.0 grams of $K_2S_2O_8$, 1.5 grams of $Na_2HPO_4$, 0.75 grams of $NaHSO_3$ and 3.5 grams of $C_7F_{15}CO_2K$ was added to a glass-lined stirred stainless steel reactor. Eight grams of

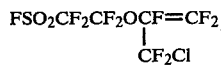

and 1.55 grams of ClCF$_2$CF$_2$CF$_2$OCF—CF$_2$—O—CF=CF$_2$ were added to the deoxygenated water in the reactor. The mixture was held under a 59 psi pressure of tetrafluoroethylene for 1¼ hours at 20° C. The reactor was then vented, evacuated under vacuum and heated to 50° C. to remove volatiles. The contents of the reactor were then frozen, thawed and filtered, using vigorous washing to remove residual inorganics and soap from the polymer. The precipitate was then vacuum dried at 110° C. for 16 hours. 18 grams of polymer was recovered which had an equivalent weight of 1350. A portion of the polymer was pressed into a film and hydrolyzed to the acid form. It had a water absorption value of 15.2%.

EXAMPLE 8

400 ml of deoxygenated water containing 3.0 grams of K$_2$S$_2$O$_8$, 1.5 grams of Na$_2$HPO$_4$, 0.75 grams of NaHSO$_3$ and 3.5 grams of C$_7$F$_{15}$CO$_2$K was added to a stirred, glass-lined, stainless steel rector. Six grams of

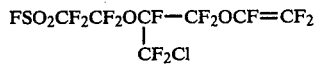

and 1 gram of

were then added to the water in the reactor. The mixture was held under a 56 psi tetrafluoroethylene pressure for one hour at 20° C. while being stirred. The reactor was then vented, evacuated under vacuum and heated to 45° C. for one hour to remove volatiles. The reactor contents were then removed and frozen. Later, they were thawed and filterd, using a water wash to remove residual inorganics and soap. After filtering, the polymer was vacuum dried for 16 hours at 110° C. 20.9 grams of polymer was obtained. IR analysis confirmed the presence of the —SO$_2$F group with bands at 1465 and 820 cm$^{-1}$. The polymer was analyzed and found to contain 0.082% chloride.

We claim:

1. Polymers useful as ion exchange membranes produced from the free radical initiated co-polymerization of at least three monomers wherein at least one monomer is selected from a first group consisting of tetrafluoroethylene, trifluoromonochloroethylene, trifluoroethylene, vinylidene fluoride, 1,1-difluoro-2,2-dichloroethylene, 1,1-difluoro-2-chloroethylene, hexafluoropropylene, 1,1,1,3,3-pentafluoropropylene, octafluoroisobutylene, ethylene, vinylchloride, trifluoronitrosomethane, perfluoronitrosoethane and alkyl vinyl ether, and at least one other monomer is selected from a second group represented by the general formula:

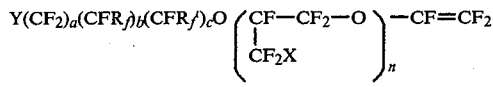

where:
Y is an acid group or an acid derivative easily convertible to an acid group;
a is zero to three;
b is zero to three;
c is 0 or 1;
a+b+c≠0;
X is Cl or Br or mixtures thereof when n>1;
n is zero to six; and
R$_f$ and R'$_f$ are independently selected from the group consisting of F, Cl, perfluoroalkyl radical and fluorochloroalkyl radical; and
at least one other monomer is selected from a third group of monomers represented by the general formula:

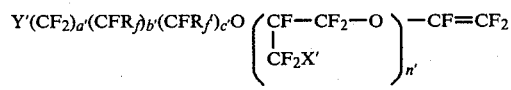

where:
Y' is Cl or Br;
a' is zero to three;
b' is zero to three;
c' is zero or one;
a'+b'+c'≠0;
X' is F, Cl, Br, or mixtures thereof when n'>1;
n' is zero to six; and R$_f$ and R'$_f$ are independently selected from the group consisting of F, Cl, perfluoroalkyl radical and chloroperfluoro alkyl radical.

2. The polymers of claim 1 when Y is selected from the group consisting of ZSO$_2$,

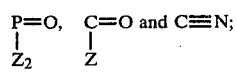

where
Z is I, Br, Cl, F, NRR' or OA;
R and R' are independently selected from the group consisting of hydrogen, an alkyl having one or more than one carbon atoms and an aryl;
A is an alkali metal, quaternary nitrogen, or R.

3. The polymers of claim 2 where the monomer(s) selected from the first group is tetrafluoroethylene, chlorotrifluoroethylene or mixtures thereof.

4. The polymers of claims 2 or 3 where Y is ZSO$_2$ or COZ.

5. The polymers of claim 2 or 3 where Y is ZSO$_2$.

6. The polymers of claim 5 where Z is F, Cl or OA.

7. The polymers of claim 2 or 3 where a=0–3; b=0–3; n=0–6; a'=0–3; b'=0–3; n'=0–6; R$_f$=Cl or F and R$_f'$=Cl or F.

8. The polymers of claims 2 or 3 where n=0 or 1 and X=Cl when n=1.

9. The polymers of claim 5 where n'=0–1 and X'=F or Cl when n'=1.

10. A free radical initiated polymerization process for the preparation of polymers suitable for use as ion exchange membranes from ethylenically unsaturated monomers comprising reacting at least one monomer from a first group consisting of tetrafluoroethylene, trifluoromonochloroethylene, trifluoroethylene, vinylidene fluoride, 1,1-difluoro-2,2-dichloroethylene, 1,1-difluoro-2-chloroethylene, hexafluoropropylene, 1,1,1,3,3-pentafluoropropylene, octafluoroisobutylene, ethylene, vinylchloride, trifluoronitrosomethane, perfluoronitrosoethane and alkyl vinyl ether; with at least one monomer selected from a second group represented by the general formula:

$$Y(CF_2)_a(CFR_f)_b(CFR_f')_cO\left(\begin{array}{c}CF-CF_2-O\\|\\CF_2X\end{array}\right)_n-CF=CF_2$$

where:
Y is an acid group or a group easily convertible to an acid group;
a is zero to three;
b is zero to three;
c is 0 or 1;
$a+b+c \neq 0$;
X is Cl or Br, or mixtures thereof when $n>1$;
n is zero to six; and
$R_f$ and $R_f'$ are independently selected from the group consisting of F, Cl, perfluoroalkyl radical and fluorochloroalkyl radical; and employing at least one monomer selected from a third group of monomers represented by the general formula:

$$Y'(CF_2)_{a'}(CFR_f)_{b'}(CFR_f')_{c'}O\left(\begin{array}{c}CF-CF_2-O\\|\\CF_2X'\end{array}\right)_{n'}-CF=CF_2$$

where:

Y' is Cl or Br;
a' is zero to three;
b' is zero to three;
c' is zero or one;
$a'+b'+c' \neq$;
X' is F, Cl, Br, or mixtures thereof when $n'>1$;
n' is zero to six; and
$R_f$ and $R_f'$ are independently selected from the group consisting of F, Cl, perfluoroalkyl radical and chloroperfluoro alkyl radical.

11. The process of claim 10 where Y is selected from the group consisting of $$ZSO_2, \underset{Z_2}{P}=O, \underset{Z}{C}=O \text{ and } C\equiv N$$

where
Z is I, Br, Cl, F, NRR' or OA;
R and R' are independently selected from the group consisting of hydrogen, an alkyl having one or more than one carbon atom, or an aryl;
A is an alkali metal, quaternary nitrogen, or R.

12. The process of claim 11 where the monomer(s) selected from the first group is tetrafluoroethylene, chlorotrifluoroethylene or mixtures thereof.

13. The process of claims 10 or 11 where $Y=ZSO_2$ or COZ.

14. The process of claims 10 or 11 where $Y=ZSO_2$.

15. The process of claim 14 where Z is F, Cl or OA.

16. The process of claims 10 or 11 where a=0-3; b=0-3; n=0-6; a'=0-3; b'=0-3; n'=0-6; $r_f$=Cl or F and $R_f'$=Cl or F.

17. The process of claims 10 or 11 where n=0 or 1 and X=Cl when n=1.

18. The process of claim 14 where n'=0 or 1 and X'=F or Cl when n'=1.

* * * * *

UNITED STATES PATENT AND TRADEMARK OFFICE
CERTIFICATE OF CORRECTION

PATENT NO. : 4,330,654
DATED : May 18, 1982
INVENTOR(S) : Bobby R. Ezzell, William P. Carl and William A. Mod It is certified that error appears in the above—identified patent and that said Letters Patent is hereby corrected as shown below:

Col. 1, line 26, delete "elastromeric" and insert --elastomeric--.

Col. 1, line 66, delete "1977118597" and insert --1977-118597--.

Col. 2, line 44, delete "were" and insert --where--.

Col. 2, line 49, delete "these" and insert --three--.

Col. 3, line 33, the formula reading

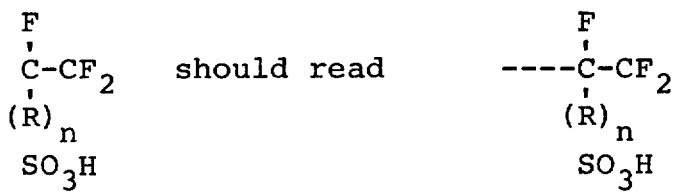

Col. 5, line 36, delete "Cl" and insert --Cl,--.
Col 4, line 69, delete ";" and insert --:--.

UNITED STATES PATENT AND TRADEMARK OFFICE
CERTIFICATE OF CORRECTION

PATENT NO. : 4,330,654
DATED : May 18, 1982
INVENTOR(S) : Bobby R. Ezzell, William P. Carl & William A. Mod It is certified that error appears in the above—identified patent and that said Letters Patent is hereby corrected as shown below:

Col. 6, line 5, delete "perfluoromethylycyclohexane" and insert --perfluoromethylcyclohexane--.

Col. 6, line 40, delete "farication" and insert --fabrication--.

Col. 6, line 64, delete "were" and insert --where--.

Col. 8, line 7, after Optionally insert --,--.

Col. 9, lines 5 and 6, delete "vaccum" and insert --vacuum--.

Col. 9, line 14, after 3.25% insert --,--.

Col. 9, line 28, delete "2-1/4" and insert --2-1/2--.

Col. 9, line 37, delete the words in italic "form or the K" and write them out in normal print --form or the K--.

Col. 9, line 39, delete "adsorption" and insert --absorption--.

UNITED STATES PATENT AND TRADEMARK OFFICE
CERTIFICATE OF CORRECTION

PATENT NO. : 4,330,654  Page 3 of 3

DATED : May 18, 1982

INVENTOR(S) : Bobby R. Ezzell, William P. Carl & William A. Mod

It is certified that error appears in the above—identified patent and that said Letters Patent is hereby corrected as shown below:

Col. 10, line 30, delete "$cm^1$" and insert --$cm^{-1}$--.

Col. 11, line 27, delete "rector" and insert --reactor--.

Col. 11, line 47, delete "filterd" and insert --filtered--.

Col. 14, Claim 10, line 5, after $\neq$ insert --0--.

Signed and Sealed this

Fifth Day of October 1982

[SEAL]

Attest:

Attesting Officer

GERALD J. MOSSINGHOFF

Commissioner of Patents and Trademarks